(12) United States Patent
Choi et al.

(10) Patent No.: US 12,262,221 B2
(45) Date of Patent: Mar. 25, 2025

(54) ELECTRONIC DEVICE AND OPERATION METHOD OF ELECTRONIC DEVICE FOR DECIDING CELL ON OR OFF THRESHOLD BASED ON TRAFFIC

(71) Applicant: Samsung Electronics Co., Ltd., Suwon-si (KR)

(72) Inventors: Minsuk Choi, Suwon-si (KR); Kyungrae Kim, Suwon-si (KR); Hyokyung Woo, Suwon-si (KR); Seowoo Jang, Suwon-si (KR); Hongjun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 17/946,662

(22) Filed: Sep. 16, 2022

(65) Prior Publication Data
US 2023/0032030 A1    Feb. 2, 2023

Related U.S. Application Data

(63) Continuation of application No. PCT/KR2022/011138, filed on Jul. 28, 2022.

(30) Foreign Application Priority Data

Jul. 28, 2021  (KR) .................. 10-2021-0099223
Mar. 14, 2022  (KR) .................. 10-2022-0031476

(51) Int. Cl.
*G06N 3/092*    (2023.01)
*G06N 20/00*    (2019.01)
(Continued)

(52) U.S. Cl.
CPC ............ *H04W 16/22* (2013.01); *G06N 3/092* (2023.01); *G06N 20/00* (2019.01); *H04B 17/11* (2015.01);
(Continued)

(58) Field of Classification Search
CPC ..... G06N 3/002–126; G06N 20/00–20; H04B 17/0082–3913; H04L 41/14–26;
(Continued)

(56) References Cited

U.S. PATENT DOCUMENTS

2011/0306312 A1    12/2011    Hamalainen
2013/0310048 A1    11/2013    Hunukumbure et al.
(Continued)

FOREIGN PATENT DOCUMENTS

CN    111010725 A    4/2020
CN    113055903 A    6/2021
(Continued)

OTHER PUBLICATIONS

CMCC, TR 37.817 v0.2.0 (Cover Page), R3-212990, 3GPP TSG-RAN WG3 Meeting #112 electronic, Online, Jun. 9, 2021 (Year: 2021).*
(Continued)

*Primary Examiner* — Timothy J Weidner
(74) *Attorney, Agent, or Firm* — Jefferson IP Law, LLP

(57) ABSTRACT

An electronic device is provided. The electronic device includes a communication circuit, a memory configured to store a learning model, and at least one processor, wherein the at least one processor is configured to obtain data related to a network situation of a base station from the communication circuit, calculate a performance indicator value related to network performance according to a performance indicator, based on the data related to the network situation, train the model, based on the performance indicator value calculated according to the performance indicator, determine an off threshold of traffic for turning off a cell, based on the trained model, and transmit the determined off threshold to the base station via the communication circuit.

21 Claims, 8 Drawing Sheets

(51) Int. Cl.
| | |
|---|---|
| *H04B 17/11* | (2015.01) |
| *H04B 17/21* | (2015.01) |
| *H04B 17/391* | (2015.01) |
| *H04L 41/14* | (2022.01) |
| *H04L 41/16* | (2022.01) |
| *H04W 16/22* | (2009.01) |
| *H04W 24/02* | (2009.01) |
| *H04W 24/08* | (2009.01) |
| *H04W 28/08* | (2023.01) |
| *H04W 52/02* | (2009.01) |
| *H04W 84/02* | (2009.01) |
| *H04W 88/08* | (2009.01) |
| *H04W 88/12* | (2009.01) |
| *H04W 92/02* | (2009.01) |
| *H04W 92/12* | (2009.01) |

(52) U.S. Cl.
CPC ......... *H04B 17/21* (2015.01); *H04B 17/3912* (2015.01); *H04B 17/3913* (2015.01); *H04L 41/145* (2013.01); *H04L 41/16* (2013.01); *H04W 24/02* (2013.01); *H04W 24/08* (2013.01); *H04W 28/0908* (2020.05); *H04W 28/0917* (2020.05); *H04W 28/0942* (2020.05); *H04W 28/095* (2020.05); *H04W 52/0206* (2013.01); *H04W 52/0212* (2013.01); *H04W 84/02* (2013.01); *H04W 88/08* (2013.01); *H04W 88/12* (2013.01); *H04W 92/02* (2013.01); *H04W 92/12* (2013.01); *Y02D 30/70* (2020.08)

(58) Field of Classification Search
CPC ..... H04W 8/005–30; H04W 16/02–32; H04W 24/02–10; H04W 28/02–26; H04W 48/02–20; H04W 52/02–60; H04W 84/005–22; H04W 88/005–188; H04W 92/02–24; Y02D 30/70
See application file for complete search history.

(56) References Cited

U.S. PATENT DOCUMENTS

| | | | |
|---|---|---|---|
| 2017/0086135 | A1 | 3/2017 | Matsuo |
| 2018/0299862 | A1 | 10/2018 | Zhao et al. |
| 2021/0006481 | A1 | 1/2021 | Gao et al. |
| 2023/0325711 | A1* | 10/2023 | Haraldson ............. H04W 16/22 |

FOREIGN PATENT DOCUMENTS

| | | |
|---|---|---|
| CN | 113133094 A | 7/2021 |
| EP | 2 568 753 A1 | 3/2013 |
| KR | 10-0269337 B1 | 10/2000 |
| KR | 10-2216141 B1 | 2/2021 |
| WO | 2020/121084 A1 | 6/2020 |

OTHER PUBLICATIONS

Ericsson, AI/ML for energy efficiency use case discussion, R3-212315, 3GPP TSG-RAN WG3 Meeting #112-e, Online meeting, May 6, 2021.

CMCC, TR 37.817 v0.2.0 (Cover Page), R3-212990, 3GPP TSG-RAN WG3 Meeting #112 electronic, Online, Jun. 9, 2021.

CMCC (Moderator), SoD Data Collection Use Cases, R3-212689, 3GPP TSG-RAN WG3 Meeting #112electronic, Online, May 25, 2021.

ZTE et al., Solution to AI based UE Trajectory prediction, R3-212029, 3GPP TSG-RAN WG3 #112-e, Online, May 7, 2021.

International Search Report dated Nov. 1, 2022, issued in International Application No. PCT/KR2022/011138.

ZTE et al., Solution to AI based Energy Saving, R3-212031, 3GPP TSG-RAN WG3 #112-e, May 7, 2021, Online, XP052002277.

ZTE, update the concept of Statistical ESM, S5-113711, 3GPP TSG SA WG5 (Telecom Management) Meeting #80, Nov. 6, 2011, San Francisco, USA, XP050578928.

European Search Report dated Jul. 25, 2024, issued in European Application No. 22849908.3.

* cited by examiner

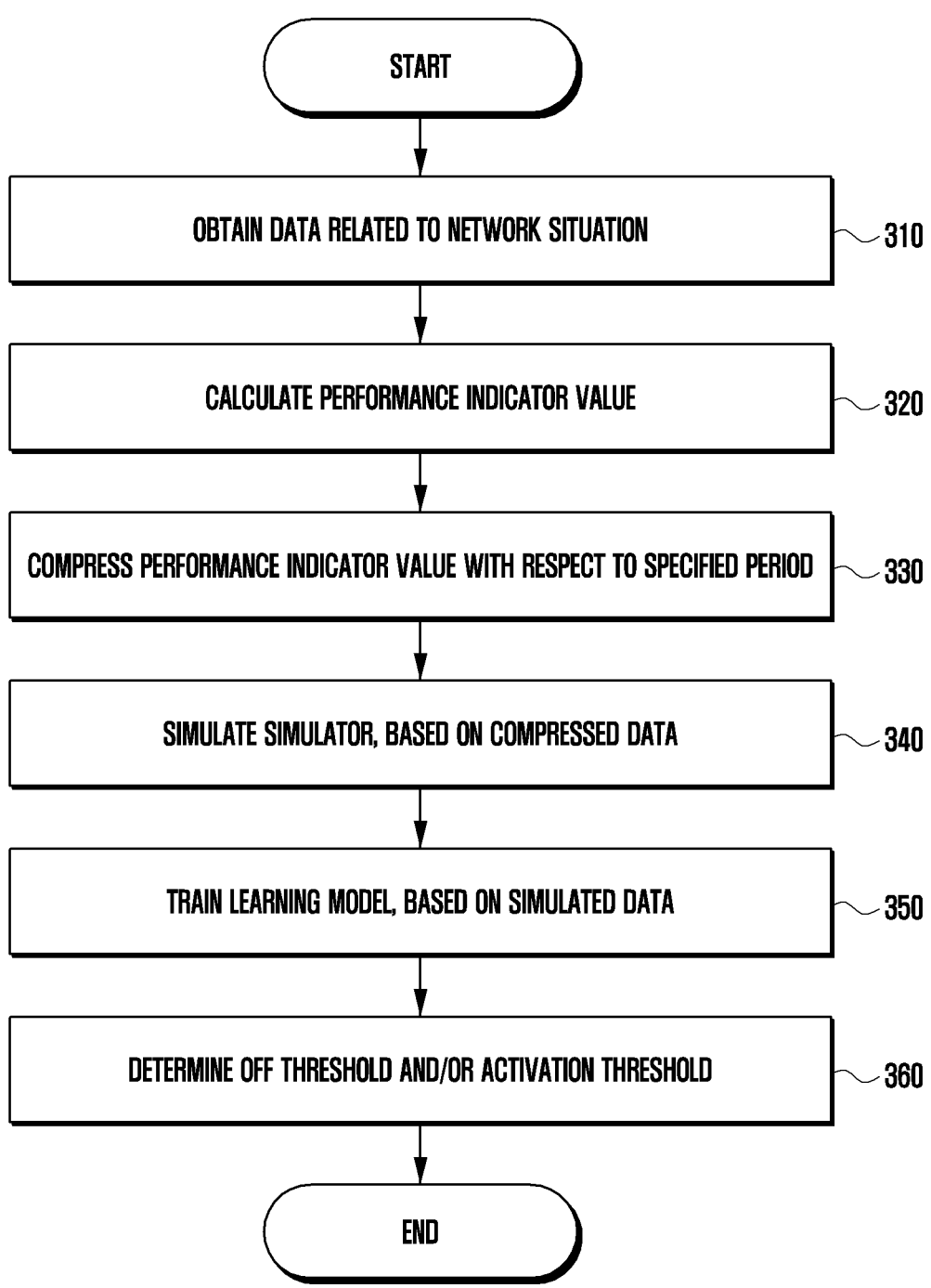

ELECTRONIC DEVICE AND OPERATION METHOD OF ELECTRONIC DEVICE FOR DECIDING CELL ON OR OFF THRESHOLD BASED ON TRAFFIC

CROSS-REFERENCE TO RELATED APPLICATION(S)

This application is a continuation application, claiming priority under § 365(c), of an International application No. PCT/KR2022/011138, filed on Jul. 28, 2022, which is based on and claims the benefit of a Korean patent application number 10-2021-0099223, filed on Jul. 28, 2021, in the Korean Intellectual Property Office, and of a Korean patent application number 10-2022-0031476, filed on Mar. 14, 2022, in the Korean Intellectual Property Office, the disclosure of each of which is incorporated by reference herein in its entirety.

TECHNICAL FIELD

The disclosure relates to an electronic device for determining a cell on or off threshold based on traffic, and a method for operating the electronic device. More particularly, the disclosure relates to an electronic device for determining a cell on or off threshold through enhanced learning in order to reduce power consumption while maintaining network performance, and a method for operating the electronic device.

BACKGROUND ART

There have been efforts to develop improved $5^{th}$ generation (5G) communication systems or pre-5G communication systems to satisfy wireless data traffic demands that have been increasing since commercialization of $4^{th}$ generation (4G) communication systems. For this reason, 5G communication systems or pre-5G communication systems are referred to as Beyond 4G network communication systems or post long term evolution (LTE) systems. In order to accomplish higher data transmission rates, it has been considered to implement 5G communication systems in super-higher frequency (mmWave) bands (for example, 6 GHz or higher bands) in addition to frequency bands that have been used by LTE (6 GHz or lower bands). There has been discussion on technologies, in 5G communication systems, regarding beamforming, massive multiple-input multiple-output (MIMO), full dimensional MIMO (FD-MIMO), array antenna, analog beam-forming, and large scale antenna.

In line with development of mobile network technologies, it has been requested to improve performances, such as network reliability, bandwidth, and response time. In order to satisfy requirements, network operators are introducing new technologies or increasing the number of installed base stations. Such an increase in quality/quantity of technologies has resulted in increased power consumption regarding communication network services.

The above information is presented as background information only to assist with an understanding of the disclosure. No determination has been made, and no assertion is made, as to whether any of the above might be applicable as prior art with regard to the disclosure.

DISCLOSURE

Technical Problem

In order to control power consumed by a network service, a scheme based on real-time traffic may be used such that a cell may be turned off if the traffic is lower than a designated off threshold, and a peripheral cell in a deactivated state is turned on if the traffic is higher than an activation threshold. However, it is difficult to predict the peripheral environment as a result of turning off the cell, and it may thus be customary to conservatively configure a low off threshold, and this may place a restriction on reducing power consumption.

Aspects of the disclosure are to address at least the above-mentioned problems and/or disadvantages and to provide at least the advantages described below. Accordingly, an aspect of the disclosure is to provide an electronic device and a method for operating the electronic device, wherein, in connection with determining an off threshold for turning off a network cell and an activation threshold for activation thereof as described above, enhanced learning is applied adaptively to areas and/or times, thereby reducing power consumption while maintaining the minimum network performance to be guaranteed.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication circuit, a memory configured to store a learning model, and at least one processor, wherein the at least one processor is configured to obtain data related to a network situation of a base station from the communication circuit, calculate a performance indicator value related to network performance according to a performance indicator, based on the data related to the network situation, train the model, based on the performance indicator value calculated according to the performance indicator, determine an off threshold of traffic for turning off a cell, based on the trained model, and transmit the determined off threshold to the base station via the communication circuit.

In accordance with another aspect of the disclosure, a method of operating an electronic device is provided. The method includes obtaining data related to a network situation of a base station from a communication circuit, calculating a performance indicator value related to network performance according to a performance indicator, based on the data related to the network situation, training a model, based on the performance indicator value calculated according to the performance indicator, determining an off threshold of traffic for turning off a cell, based on the trained model, and transmitting the determined off threshold to the base station via the communication circuit.

Advantageous Effects

According to various embodiments of the disclosure, an electronic device may adaptively turn a cell on/off in response to a traffic situation.

According to various embodiments of the disclosure, an electronic device may provide a model adaptive to areas and/or times in connection with determining an off threshold of traffic for turning a cell off.

According to various embodiments of the disclosure, an electronic device may provide a model adaptive to areas and/or times in connection with determining an activation threshold of traffic for activation of a cell.

According to various embodiments of the disclosure, an electronic device may maintain at least a designated level of network performance by configuring restrictions, such as minimum performance levels.

According to various embodiments of the disclosure, an electronic device may reduce power consumption while maintaining network performance.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 3 is a flowchart illustrating a method of controlling, by a processor, an electronic device to determine an off threshold and/or an activation threshold, according to an embodiment of the disclosure;

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
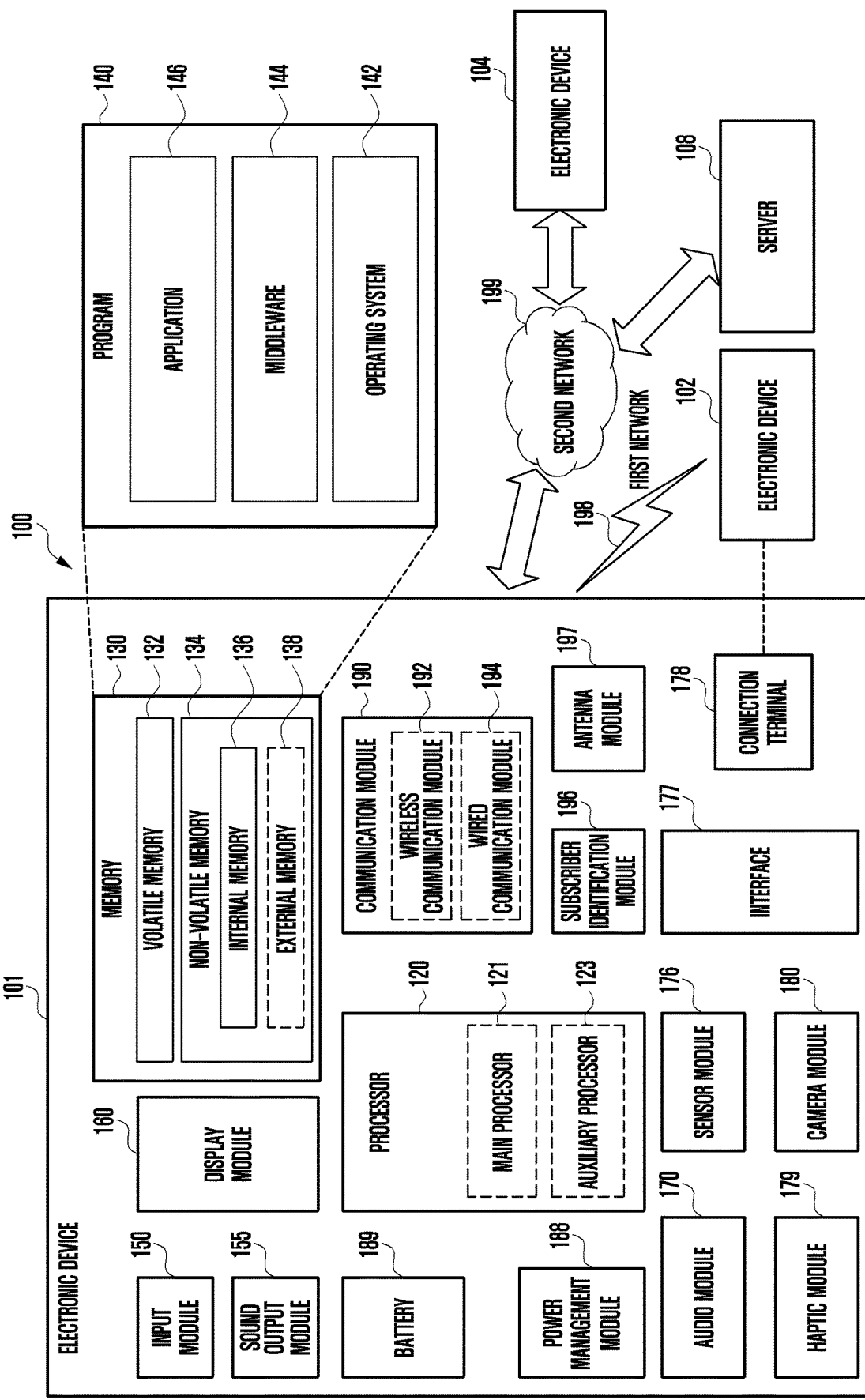
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
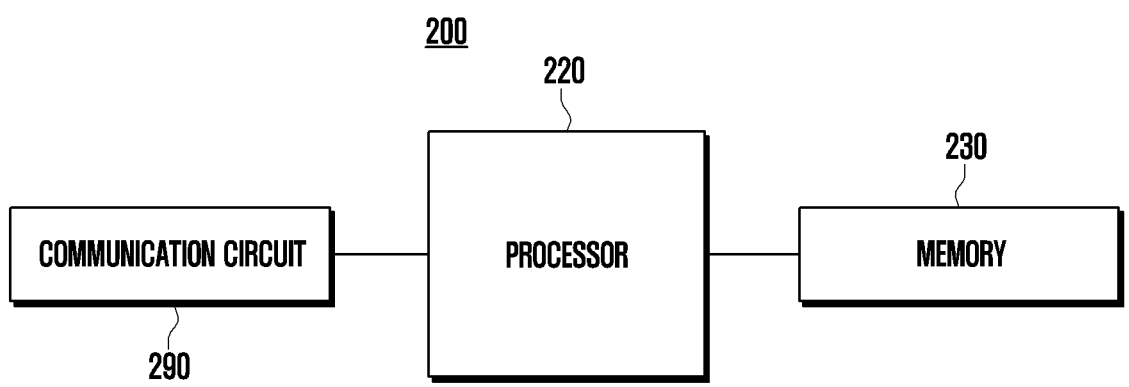
FIG. 2 is a block diagram of an electronic device according to an embodiment of the disclosure.

FIG. 2 is a block diagram of an electronic device according to an embodiment of the disclosure.

Referring to FIG. 2, an electronic device 200 (e.g., the electronic device 101 of FIG. 1) may include a processor 220 (e.g., the processor 120 of FIG. 1), a memory 230 (e.g., the memory 130 of FIG. 1), and/or a communication circuitry 290 (e.g., the communication module 190 of FIG. 1). The components illustrated in FIG. 2 are for some of the components included in the electronic device 200, and in addition, the electronic device 200 may include various other components as illustrated in FIG. 1.

According to various embodiments of the disclosure, the communication circuit 290 may communicate with an external electronic device (e.g., a base station) via a network (e.g., the first network 198 and/or the second network 199 of FIG. 1) to receive and/or transmit various pieces of information.

According to an embodiment of the disclosure, the communication circuit 290 may collect data related to a network situation of a base station. For example, the data related to the network situation may include statistical data (e.g., available downlink PRB (the number of downlink resource blocks available in a corresponding cell), and/or used downlink PRB (the number of downlink resource blocks used in a corresponding cell)) of the base station.

According to various embodiments of the disclosure, the memory 230 may store a learning model.

According to an embodiment of the disclosure, the learning model may be a reinforcement learning model of a Markov decision process (MDP) scheme. The MDP may be a scheme of training a model such that a reward is maximized, by designating a reward value for an action which may be taken in a predetermined state. For example, the MDP may be a scheme of determining an action which maximizes a reward for each state.

According to an embodiment of the disclosure, the learning model may be updated according to a learning result obtained by the processor 220 and stored in the memory 230.

According to various embodiments of the disclosure, the processor 220 may determine an off threshold of traffic for turning off a cell and/or an activation threshold of traffic for activating the cell.

According to an embodiment of the disclosure, the processor 220 may obtain data related to a network situation from the communication circuit 290.

According to an embodiment of the disclosure, the processor 220 may calculate a performance indicator value, based on a performance indicator. For example, the performance indicator value may be data related to network performance.

For example, the performance indicator may be a key performance indicator (KPI) defined by a service provider to indicate the network performance, based on the data related to the network situation. For example, the performance indicator may include physical resource block (PRB) usage, internet protocol (IP) throughput, the number of user equipments (UEs) connected to radio resource control (RRC), a handover count, and downlink volume. For example, the processor 220 may calculate PRB usage information (e.g., average downlink PRB usage (%)) which is the performance indicator value, based on PRB usage (e.g., used downlink PRB/available downlink PRB) which is the performance indicator.

According to an embodiment of the disclosure, the processor 220 may divide and overlap the obtained performance indicator values in the unit (e.g., 1 day) of a specified period, and then align the performance indicator values with regard to each time.

According to an embodiment of the disclosure, the processor 220 may generate compressed data in the unit of a period in various schemes, based on the performance indicator values aligned with regard to each time. For example, a first scheme may be related to generating compressed data by extracting the largest value from performance indicator values aligned with regard to each time. For example, a second scheme may be related to generating compressed data by extracting an upper-level value of a specified ratio from performance indicator values aligned with regard to each time. For example, a third scheme may be related to generating compressed data by extracting an average value from performance indicator values aligned with regard to each time. For example, a fourth scheme may be related to generating compressed data by extracting a lower-level value of a specified ratio from performance indicator values aligned with regard to each time. For example, a fifth scheme may be a scheme of generating compressed data by extracting the smallest value from performance indicator values aligned with regard to each time. The compressed data generated by the first scheme may be trained in a direction to ensure network stability when a model is trained, and the compressed data generated by the fifth scheme may be trained in a direction to strengthen energy saving.

According to an embodiment of the disclosure, the processor 220 may simulate compressed data by a simulator. For example, the processor 220 may simulate and evaluate a cell on/off situation with respect to the compressed data by using the simulator.

According to an embodiment of the disclosure, the processor 220 may train a learning model, based on the compressed data simulated by the simulator.

According to an embodiment of the disclosure, the processor 220 may configure a constraint. The constraint may be a configuration for training the learning model to act in a specific scheme. For example, the processor 220 may receive an input of the type of object performance and a minimum performance level to configure the constraint. For example, the type of object performance may be a performance indicator value (e.g., IP throughput) to be used for training among performance indicator values (e.g., physical resource block (PRB) usage information, IP throughput, the number of UEs connected to RRC, a handover count, and downlink volume). For example, a minimum performance criterion may be a minimum level (e.g., 1 Mbps) for which a result of acting of a trained model is satisfied.

According to an embodiment of the disclosure, the learning model may be a reinforcement learning model of a Markov decision process (MDP) scheme. The MDP may be a scheme of training a model such that a reward is maximized, by designating a reward value for an action which may be taken in a predetermined state. For example, the MDP scheme may be a training scheme of determining an action which maximizes a reward for each state.

According to an embodiment of the disclosure, the processor 220 may configure a state, an action, and a reward in the learning model.

For example, the state may include at least one of day and/or time information based on compressed data simulated by the simulator, an on and/or off state of a cell, PRB usage before a specified time (e.g., 4 hours ago), and throughput before the specified time (e.g., 4 hours ago).

For example, the action may include an off threshold of a cell and/or an activation threshold of the cell.

For example, the reward may include a reward of applying (+) a specified value when power consumption is reduced, a reward of applying (+) a specified value when an object performance increases, and a penalty of subtracting (−) a specified value when an object performance is less than a minimum performance level. For example, in response to the constraint that the object performance is IP throughput and the minimum performance criterion is 1 Mbps, the reward may include a reward of applying a specified value when the IP throughput increases, and a penalty of subtracting a specified value when the throughput is less than 1 Mbps.

According to various embodiments of the disclosure, the processor 220 may determine an off threshold of traffic for turning off a cell and/or an activation threshold of traffic for activating the cell.

According to an embodiment of the disclosure, the processor 220 may input a state to a trained model, based on data related to a network situation and/or compressed data simulated by the simulator, and obtain, from the model, a traffic-based off threshold for turning off a cell and/or a traffic-based activation threshold for activating the cell.

FIG. 3 is a flowchart illustrating a method of controlling, by a processor, an electronic device to determine an off threshold and/or an activation threshold of traffic for activation, according to an embodiment of the disclosure.

Referring to FIG. 3, according to various embodiments of the disclosure, in operation 310, the processor 220 may obtain data related to a network situation.

According to an embodiment of the disclosure, the processor 220 may obtain the data related to the network situation from the communication circuit 290. For example, the data related to the network situation may include statistical data (e.g., available downlink PRB (the number of downlink resource blocks available in a corresponding cell), and/or used downlink PRB (the number of downlink resource blocks used in a corresponding cell)) of a base station.

According to an embodiment of the disclosure, in operation 320, the processor 220 may calculate a performance indicator value.

According to an embodiment of the disclosure, the processor 220 may calculate the performance indicator value, based on a performance indicator. For example, the performance indicator value may be data related to network performance.

For example, the performance indicator may be a key performance indicator (KPI) defined by a service provider to indicate the network performance, based on the data related to the network situation. For example, the performance indicator may include physical resource block (PRB) usage information, IP throughput, the number of UEs connected to RRC, a handover count, and downlink volume. For example, the processor 220 may calculate PRB usage information (e.g., average downlink PRB usage (%)) which is the performance indicator value, based on PRB usage (e.g., used downlink PRB/available downlink PRB) which is the performance indicator.

According to various embodiments of the disclosure, in operation 330, the processor 220 may compress the performance indicator value with respect to a specified period.

According to an embodiment of the disclosure, the processor 220 may divide the obtained performance indicator values in the unit (e.g., 1 day) of a specified period, so as to align the performance indicator values with regard to each time.

According to an embodiment of the disclosure, the processor 220 may generate compressed data in various schemes, based on the performance indicator values aligned with regard to each time. For example, a first scheme may be a scheme of generating compressed data by extracting the largest value from performance indicator values aligned with regard to each time. For example, a second scheme may be a scheme of generating compressed data by extracting an upper-level value of a specified ratio from performance indicator values aligned with regard to each time. For example, a third scheme may be a scheme of generating compressed data by extracting an average value from performance indicator values aligned with regard to each time. For example, a fourth scheme may be a scheme of generating compressed data by extracting a lower-level value of a specified ratio from performance indicator values aligned with regard to each time. For example, a fifth scheme may be a scheme of generating compressed data by extracting the smallest value from performance indicator values aligned with regard to each time.

The compressed data generated by the first scheme may be trained in a direction to ensure network stability when a model is trained, and the compressed data generated by the fifth scheme may be trained in a direction to strengthen energy saving.

According to various embodiments of the disclosure, in operation 340, the processor 220 may simulate a simulator, based on the compressed data.

According to an embodiment of the disclosure, the processor 220 may simulate the compressed data by the simulator.

According to various embodiments of the disclosure, in operation 350, the processor 220 may train a learning model, based on the compressed data simulated by the simulator.

According to an embodiment of the disclosure, the processor 220 may configure a constraint. The constraint may be a configuration for training the learning model in a specific direction of data. For example, the processor 220 may receive an input of the type of object performance and a minimum performance level to configure the constraint. For example, the object performance may be a performance indicator value (e.g., IP throughput) to be used for training among performance indicator values (e.g., physical resource block (PRB) usage information, IP throughput, the number of UEs connected to RRC, a handover count, and downlink volume). For example, a minimum performance criterion may be a minimum level (e.g., 1 Mbps) for which a result of acting of a trained model is satisfied.

According to an embodiment of the disclosure, the learning model may be a reinforcement learning model of a Markov decision process (MDP) scheme. The MDP may be a scheme of training a model such that a reward is maximized, by designating a reward value for an action which may be taken in a predetermined state. For example, the MDP may be a scheme of determining an action which maximizes a reward for each state.

According to an embodiment of the disclosure, the processor 220 may configure a state, an action, and a reward in the learning model.

For example, the state may include at least one of day and/or time information based on compressed data simulated by the simulator, an on and/or off state of a cell, PRB usage before a specified time (e.g., 4 hours ago), and throughput before the specified time (e.g., 4 hours ago).

For example, the action may include an off and/or activation threshold of a cell.

For example, the reward may apply (+) a specified value when power consumption is reduced, and apply (+) a specified value when an object performance increases, and include a penalty of subtracting (−) a specified value when an object performance is less than a minimum performance level. For example, in response to the constraint that the object performance is IP throughput and the minimum performance criterion is 1 Mbps, the reward may include a reward of applying a specified value when the IP throughput increases, and a penalty of subtracting a specified value when the throughput is less than 1 Mbps.

According to various embodiments of the disclosure, in operation 360, the processor 220 may determine a threshold of traffic for turning off a cell and/or an activation threshold for activating the cell.

According to an embodiment of the disclosure, the processor 220 may input a state to a trained model, based on data related to a network situation and/or compressed data simulated by the simulator, and obtain, from the model, a traffic-based off threshold for turning off a cell and/or a traffic-based activation threshold for activating the cell, based on obtained output data.

Figure 4A:
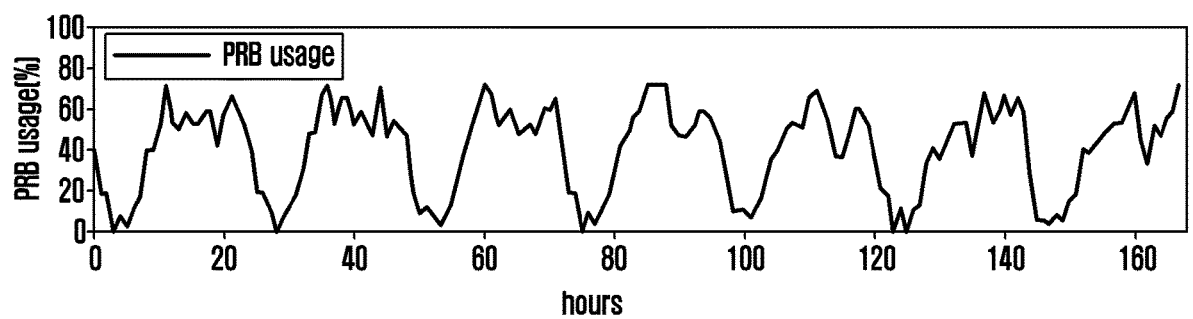
FIGS. 4A and 4B are diagrams illustrating an operation of generating, by a processor, compressed data in various schemes, based on a performance indicator, according to an embodiment of the disclosure.
Figure 4B:
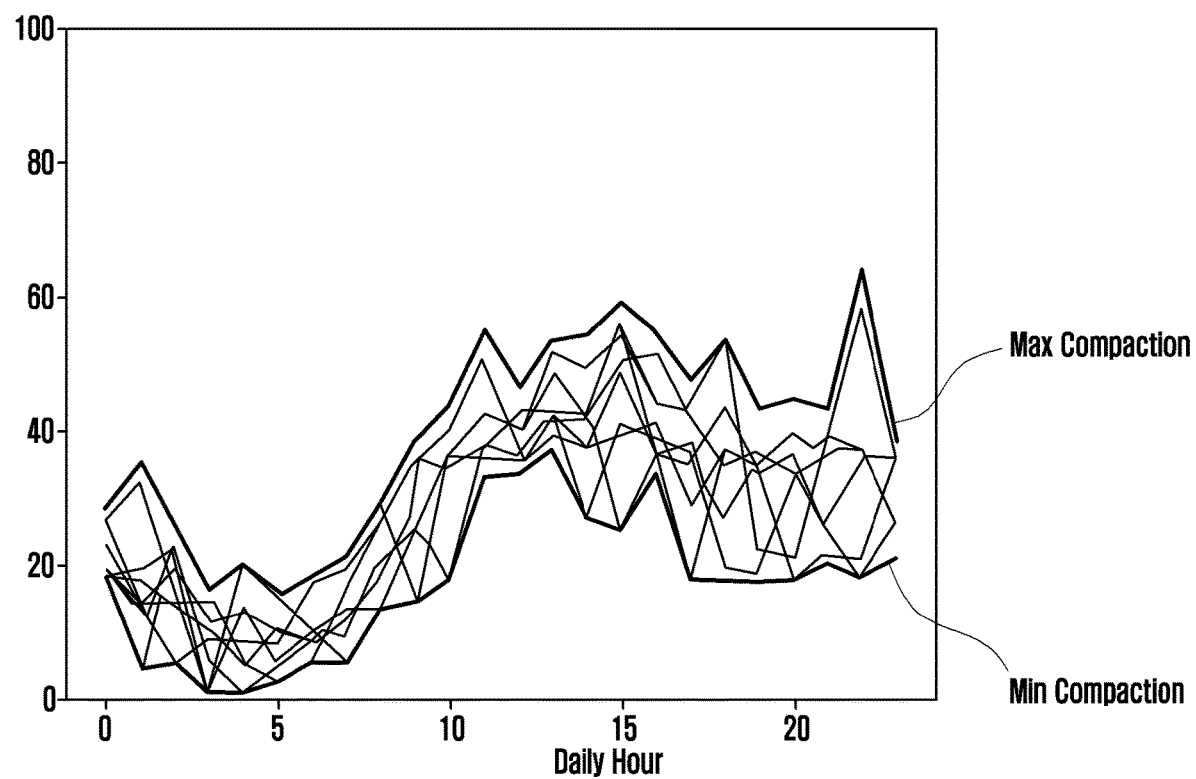

FIGS. 4A and 4B are diagrams illustrating an operation of generating, by a processor, compressed data in various schemes, based on a performance indicator value, according to an embodiment of the disclosure.

Referring to FIG. 4A, it is a diagram illustrating a graph of a performance indicator value, according to an embodiment of the disclosure. The x-axis of the graph may indicate time (hours), and the y-axis thereof may indicate a performance indicator value (e.g., PRB usage (%)).

According to various embodiments of the disclosure, the processor 220 may calculate a performance indicator value, based on a performance indicator. For example, the performance indicator may be a KPI defined by a service provider to indicate network performance, based on data related to a network situation.

For example, the performance indicator may include physical resource block (PRB) usage information, IP throughput, the number of UEs connected to RRC, a handover count, and downlink volume. For example, the processor 220 may calculate PRB usage information (e.g., average downlink PRB usage (%)) which is the performance indicator value, based on PRB usage (e.g., used downlink PRB/available downlink PRB) which is the performance indicator.

According to various embodiments of the disclosure, the processor 220 may compress the performance indicator value with respect to a specified period.

According to an embodiment of the disclosure, the processor 220 may divide the obtained performance indicator values in the unit (e.g., 1 day) of a specified period, so as to align the performance indicator values with regard to each time.

Referring to FIG. 4B, it is a diagram illustrating a graph of data in which performance indicator values are aligned with respect to a specified period, according to an embodiment of the disclosure. The x-axis of the graph may indicate the time of the day (daily hours, 0-24), and the y-axis thereof may indicate a performance indicator value (e.g., PRB usage (%)).

According to an embodiment of the disclosure, the processor 220 may generate compressed data in various schemes, based on the performance indicator values aligned with regard to each time. For example, a first scheme may be a scheme of generating compressed data by extracting the largest value from performance indicator values aligned with regard to each time. For example, a second scheme may be a scheme of generating compressed data by extracting an upper-level value of a specified ratio from performance indicator values aligned with regard to each time. For example, a third scheme may be a scheme of generating compressed data by extracting an average value from performance indicator values aligned with regard to each time. For example, a fourth scheme may be a scheme of generating compressed data by extracting a lower-level value of a specified ratio from performance indicator values aligned with regard to each time. For example, a fifth scheme may be a scheme of generating compressed data by extracting the smallest value from performance indicator values aligned with regard to each time.

For example, referring to FIG. 4B, the compressed data generated by extraction by the first scheme may be a max compaction graph, and the compressed data generated by extraction by the fifth scheme may be a min compaction graph.

Figure 5:
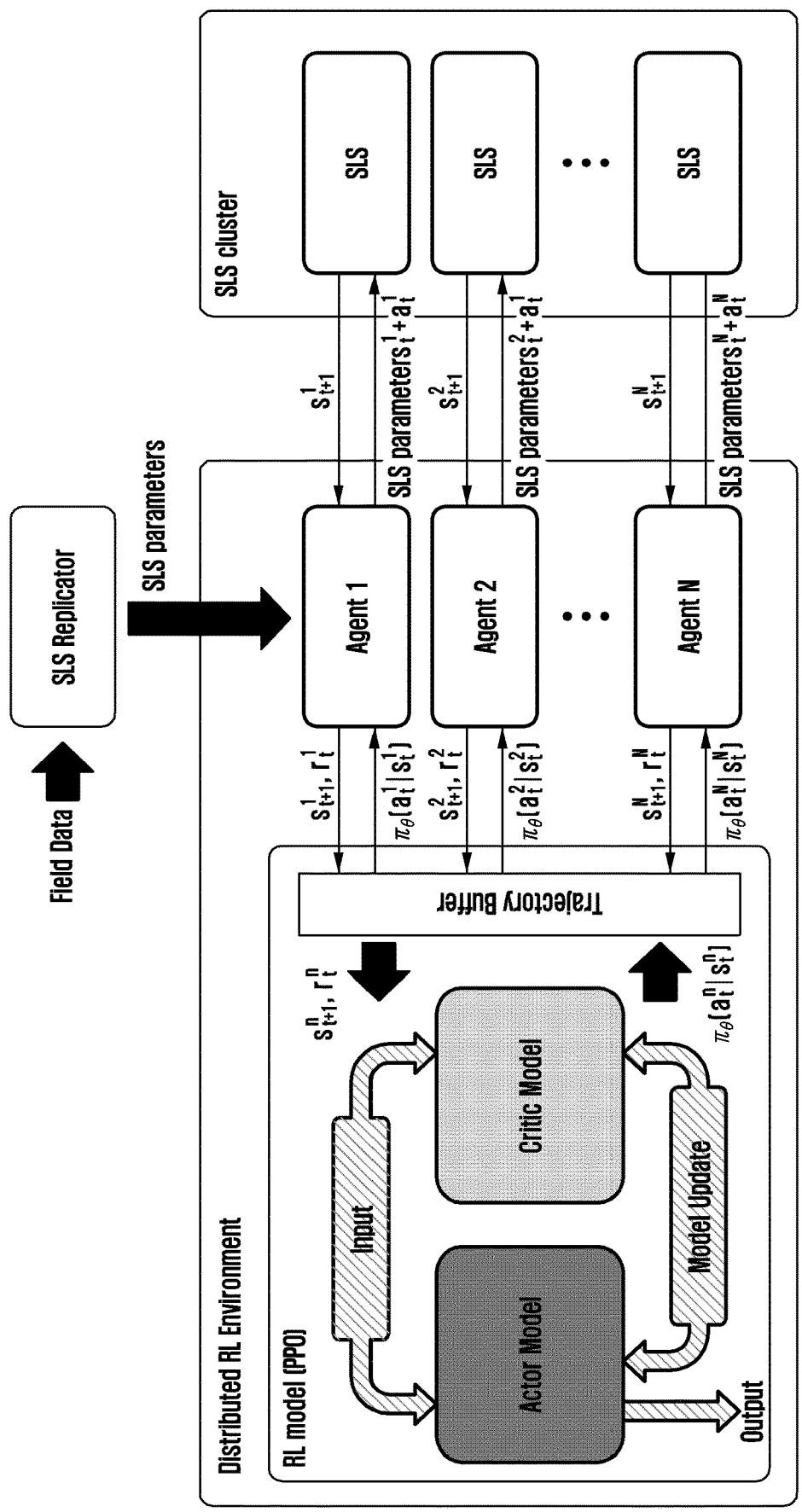
FIG. 5 is a diagram illustrating a structure of a learning model, according to an embodiment of the disclosure.

FIG. 5 is a diagram illustrating a structure of a learning model, according to an embodiment of the disclosure.

According to various embodiments of the disclosure, the processor 220 may train a learning model (e.g., operation 350 of FIG. 3), based on compressed data simulated by a simulator.

Referring to FIG. 5, according to various embodiments of the disclosure, a system level simulator (SLS) machine may simulate compressed data by the simulator by adjusting SLS parameters. For example, the SLS simulation machine (SLS) may simulate compressed data corresponding to a state to be input to the learning model by using the simulator.

According to various embodiments of the disclosure, a system level simulator cluster (SLS cluster) may be a set of SLS machines which perform an SLS in parallel through multiple remote machines in order to complement the simulation speed limit of a single SLS. For example, in the SLS cluster, at least one SLS machine may dispersively simulate compressed data by the simulator.

According to various embodiments of the disclosure, an SLS replicator may configure an environment state by adjusting an SLS parameter, based on field data.

A performance indicator may include physical resource block (PRB) usage information, IP throughput, the number of UEs connected to RRC, a handover count, and downlink volume. The SLS parameters may include a packet size and a request interval.

According to various embodiments of the disclosure, a learning model (RL model) may be a reinforcement learning model of a Markov decision process (MDP) scheme. The MDP may be a scheme of training a model such that a reward is maximized, by designating a reward value for an action which may be taken in a predetermined state. For example, the MDP may be a scheme of determining an action which maximizes a reward for each state.

According to an embodiment of the disclosure, agents 1 to N may configure a state, an action, and a reward in the learning model.

For example, the state (s) may include at least one of day and/or time information, an on and/or off state of a cell, PRB usage before a specified time (e.g., a time from the current to 4 hours ago), and throughput before the specified time (e.g., a time from the current to 4 hours ago).

For example, the action (a) may include off and/or activation thresholds of a cell.

For example, the reward (r) may include a reward of applying (+) a specified value when power consumption is reduced, a reward of applying (+) a specified value when an object performance increases, and a penalty of subtracting (−) a specified value when an object performance is less than a minimum performance level.

According to an embodiment of the disclosure, a first agent (agent 1) may train the learning model (RL model), based on the compressed data simulated by the simulator in a first state.

For example, the learning model (RL model) may output a first probability distribution ($\pi_\theta(a_t^1|s_t^1)$) for a first action ($a_t^1$) at t in a first state ($s_t^1$) at t.

For example, the first agent (agent 1) may determine a first state ($s_{t+1}^1$) at t+1 and a first reward ($r_t^1$) at t, obtained from an SLS, and input the same to the learning model (RL model).

For example, the learning model (RL model) may output the first probability distribution ($\pi_\theta(a_t^1|s_t^1)$) to select the first action $(a_t^1)$ at t in the first state $(s_t^1)$ at t, based on the first state $(s_t^1)$ at t, the first action $(a_t^1)$ at t, and the first reward $(r_t^1)$ at t.

For example, the first agent (agent 1) may train the learning model (RL model) by repeating the above process until t becomes a specified value (e.g., 23) from 0.

According to an embodiment of the disclosure, an Nth agent (agent N) may train the learning model (RL model), based on the compressed data simulated by the simulator in an N state.

According to an embodiment of the disclosure, the learning model (RL model) may output an Nth probability distribution $(\pi(a_t^N|s_t^N))$ for an Nth action $(a_t^N)$ at t in an Nth state $(s_t^N)$ at t.

According to an embodiment of the disclosure, the Nth agent (agent N) may determine an Nth state $(s_{t+1}^N)$ at t+1 and an Nth reward $(r_t^N)$ at t, obtained from an SLS, and input the same to the learning model (RL model).

According to an embodiment of the disclosure, the learning model (RL model) may output the Nth probability distribution $(\pi(a_t^N|s_t^N))$ to select the Nth action $(a_t^N)$ at t in the Nth state $(s_t^N)$ at t, based on the Nth state $(s_t^N)$ at t, the Nth action $(a_t^N)$ at t, and the Nth reward $(r_t^N)$ at t.

For example, the Nth agent (agent N) may train the learning model (RL model) by repeating the above process until t becomes a specified value (e.g., 23) from 0.

Figure 6:
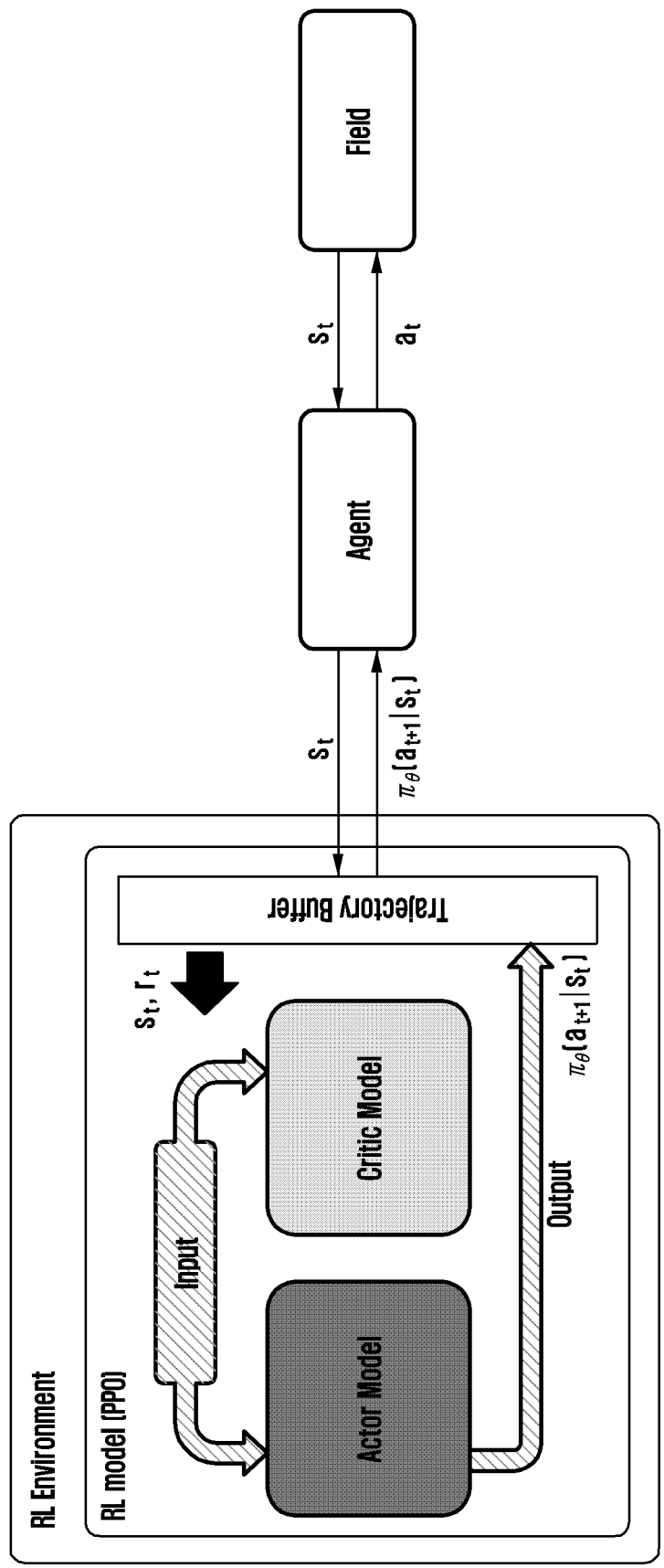
FIG. 6 is a diagram illustrating a structure of a trained model, according to an embodiment of the disclosure.

FIG. 6 is a diagram illustrating a structure of a trained model, according to an embodiment of the disclosure.

According to various embodiments of the disclosure, a processor (e.g., the processor 220 of FIG. 2) may determine (e.g., operation 360 of FIG. 3) an off threshold of traffic for turning off a cell and/or an activation threshold for activating the cell, based on a trained model.

Referring to FIG. 6, according to various embodiments of the disclosure, an agent may input a state $(s_t)$ to a learning model (RL model), based on a performance indicator value.

According to various embodiments of the disclosure, the learning model (RL model) may output a probability distribution $(\pi_0 (a_{t+1}|s_t))$ for an action $(a_{t+1})$ at t+1 in a state $(s_t)$ at t.

According to various embodiments of the disclosure, the processor 220 may determine an off threshold of traffic for turning off a cell and/or an activation threshold, based on the output action $(a_t)$.

Figure 7:
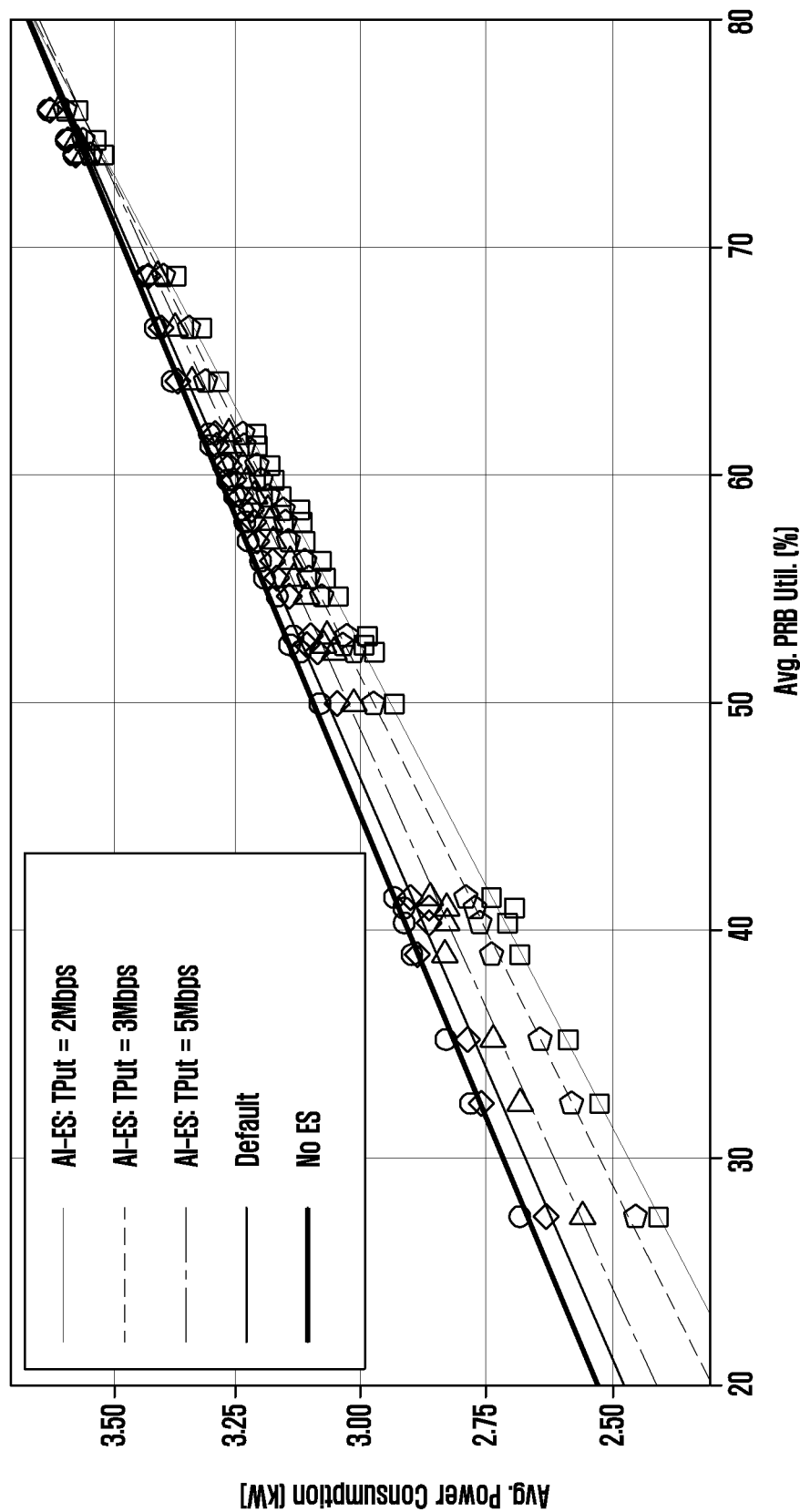
FIG. 7 is a graph illustrating an experimental result of power consumption according to physical resource block (PRB) usage with regard to each off threshold, according to an embodiment of the disclosure.

FIG. 7 is a graph illustrating an experimental result of power consumption according to PRB usage with regard to each off threshold, according to an embodiment of the disclosure.

An off threshold may indicate a threshold of traffic for turning off a cell.

Referring to FIG. 7, the x-axis may indicate average daily PRB usage, the y-axis may indicate average daily power consumption, and each graph may be a graph indicating average power consumption according to average PRB usage with regard to each off threshold. For example, No ES may be a graph in a case where an off threshold is not configured, default may be a graph in a case where an off threshold is configured to be a fixed value, AI-ES:TPut=5 Mbps may be a graph in a case where an off threshold is determined by a learning model and a minimum performance level is configured to be 5 Mbps, AI-ES:TPut=3 Mbps may be a graph in a case where an off threshold is determined by a learning model and a minimum performance level is configured to be 3 Mbps, and AI-ES:TPut=2 Mbps may be a graph in a case where an off threshold is determined by a learning model and a minimum performance level is configured to be 2 Mbps.

Referring to the graphs, it can be seen that in a case where an off threshold is not configured (No ES), power consumption is high, and in a case where the off threshold is determined by a learning model and a minimum performance level is configured to be 2 Mbps (AI-ES:TPut=2 Mbps), power consumption is low. For example, as the off threshold is determined by the learning model and the minimum performance level is configured to be lower, power consumption may be reduced.

In addition, referring to the graphs, it can be seen that a difference in power consumption for each graph in an area (e.g., 27%) in which average PRB usage is low is larger than a difference in power consumption for each graph in an area (e.g., 80%) in which average PRB usage is high. For example, in case that an off threshold is determined and applied by a learning model according to the disclosure, network quality may be maintained in an area and/or time of high PRB usage, and power consumption may be reduced in an area and/or time of low PRB usage.

An electronic device 200 according to various embodiments of the disclosure may include a communication circuit 290, a memory 230 configured to store a learning model, and a processor 220, wherein the processor 220 obtains data related to a network situation of a base station from the communication circuit 290, calculates a performance indicator value related to network performance according to a performance indicator, based on the data related to the network situation, trains the model, based on the performance indicator value calculated according to the performance indicator, determines an off threshold of traffic for turning off a cell, based on the trained model, and transmits the determined off threshold to the base station via the communication circuit 290.

In the electronic device 200 according to various embodiments of the disclosure, the processor 220 may determine an activation threshold of traffic for activating the cell, based on the trained model, and transmit the determined activation threshold to the base station via the communication circuit 290.

In the electronic device 200 according to various embodiments of the disclosure, the performance indicator may include at least one of physical resource block (PRB) usage information, IP throughput, the number of UEs connected to RRC, a handover count, and downlink volume.

In the electronic device 200 according to various embodiments of the disclosure, the processor 220 may compress the performance indicator value with respect to a specified period, and train the model, based on the compressed performance indicator value.

In the electronic device 200 according to various embodiments of the disclosure, the processor 220 may compress the performance indicator value in at least one scheme among a first scheme of generating compressed data by extracting the largest value from the performance indicator value, a second scheme of generating compressed data by extracting an upper-level value of a specified ratio from the performance indicator value, a third scheme of generating compressed data by extracting an average value from the performance indicator value, a fourth scheme of generating compressed data by extracting a lower-level value of a specified ratio from the performance indicator value, and a fifth scheme of generating compressed data by extracting the minimum value from the performance indicator value.

In the electronic device 200 according to various embodiments of the disclosure, the processor 220 may simulate, by a simulator, the compressed performance indicator value, and train the model, based on the simulated data.

In the electronic device 200 according to various embodiments of the disclosure, the processor 220 may train the model in an MDP scheme, configure, in the model, a state related to a network environment, an action including an off threshold of a cell, and a reward related to power consumption and network performance, and train the model so as to determine an action for which a highest reward is given.

In the electronic device 200 according to various embodiments of the disclosure, the processor 220 may configure, in the model, an object performance which is a type of performance subject to model training, and a minimum performance criterion which is a minimum level to satisfy a result of acting of the trained model.

In the electronic device 200 according to various embodiments of the disclosure, the state may include at least one of day and/or time information, an on and/or off state of a cell, PRB usage before a specified time, and throughput before the specified time.

In the electronic device 200 according to various embodiments of the disclosure, the reward may include at least one of a reward of applying a specified value when power consumption is reduced, a reward of applying a specified value when an object performance increases, and a penalty of subtracting a specified value when an object performance is less than a minimum performance level.

A method of operating an electronic device 200 according to various embodiments of the disclosure may include obtaining data related to a network situation of a base station from a communication circuit 290, calculating a performance indicator value related to network performance according to a performance indicator, based on the data related to the network situation, training a model, based on the performance indicator value calculated according to the performance indicator, determining an off threshold of traffic for turning off a cell, based on the trained model, and transmitting the determined off threshold to the base station via the communication circuit 290.

The method of operating the electronic device 200 according to various embodiments of the disclosure may include determining an activation threshold of traffic for activating the cell, based on the trained model, and transmitting the determined activation threshold to the base station via the communication circuit 290.

In the method of operating the electronic device 200 according to various embodiments of the disclosure, the performance indicator may include at least one of physical resource block (PRB) usage information, IP throughput, the number of UEs connected to RRC, a handover count, and downlink volume.

The method of operating the electronic device 200 according to various embodiments of the disclosure may include compressing the performance indicator value with respect to a specified period, and training the model, based on the compressed performance indicator value.

The method of operating the electronic device 200 according to various embodiments of the disclosure may include compressing the performance indicator value in at least one scheme among a first scheme of generating compressed data by extracting the largest value from the performance indicator value, a second scheme of generating compressed data by extracting an upper-level value of a specified ratio from the performance indicator value, a third scheme of generating compressed data by extracting an average value from the performance indicator value, a fourth scheme of generating compressed data by extracting a lower-level value of a specified ratio from the performance indicator value, and a fifth scheme of generating compressed data by extracting the minimum value from the performance indicator value.

The method of operating the electronic device 200 according to various embodiments may include simulating, by a simulator, the compressed performance indicator value, and training the model, based on the simulated data.

The method of operating the electronic device 200 according to various embodiments of the disclosure may include training the model in an MDP scheme, configuring, in the model, a state related to a network environment, an action including an off threshold of a cell, and a reward related to power consumption and network performance, and training the model so as to determine an action for which a highest reward is given.

The method of operating the electronic device 200 according to various embodiments of the disclosure may include configuring, in the model, an object performance which is a type of performance subject to model training, and a minimum performance criterion which is a minimum level to satisfy a result of acting of the trained model.

In the method of operating the electronic device 200 according to various embodiments of the disclosure, the state may include at least one of day and/or time information, an on and/or off state of a cell, PRB usage before a specified time, and throughput before the specified time.

In the method of operating the electronic device 200 according to various embodiments of the disclosure, the reward may include at least one of a reward of applying a specified value when power consumption is reduced, a reward of applying a specified value when an object performance increases, and a penalty of subtracting a specified value when an object performance is less than a minimum performance level.

It should be appreciated that various embodiments and the terms used therein are not intended to limit the technological features set forth herein to particular embodiments and include various changes, equivalents, or alternatives for a corresponding embodiment.

With regard to the description of the drawings, similar reference numerals may be used to refer to similar or related components.

The electronic device according to various embodiments may be one of various types of electronic devices. The electronic devices may include, for example, a portable communication device (e.g., a smailphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communication circuit;
a memory configured to store a learning model; and
at least one processor,
wherein the at least one processor is configured to:
obtain data related to a network situation of a base station from the communication circuit,
calculate a performance indicator value related to network performance according to a performance indicator, based on the data related to the network situation,
train the model, based on the performance indicator value calculated according to the performance indicator,
determine an off threshold of traffic for turning off a cell, based on the trained model, and
transmit the determined off threshold to the base station via the communication circuit.

2. The electronic device of claim 1, wherein the at least one processor is further configured to:
determine an activation threshold of traffic for activating the cell, based on the trained model, and
transmit the determined activation threshold to the base station via the communication circuit.

3. The electronic device of claim 1, wherein the performance indicator comprises at least one of physical resource block (PRB) usage information, internet protocol (IP) throughput, a number of user equipments (UEs) connected to radio resource control (RRC), a handover count, or downlink volume.

4. The electronic device of claim 1, wherein the at least one processor is further configured to:
compress the performance indicator value with respect to a specified period, and
train the model, based on the compressed performance indicator value.

5. The electronic device of claim 4, wherein the at least one processor is further configured to compress the performance indicator value in at least one scheme among:
a first scheme of generating compressed data by extracting a largest value from the performance indicator value,
a second scheme of generating compressed data by extracting an upper-level value of a specified ratio from the performance indicator value,
a third scheme of generating compressed data by extracting an average value from the performance indicator value, a fourth scheme of generating compressed data by extracting a lower-level value of a specified ratio from the performance indicator value, and a fifth scheme of generating compressed data by extracting a minimum value from the performance indicator value.

6. The electronic device of claim 4, wherein the at least one processor is further configured to:
simulate, by a simulator, the compressed performance indicator value, and
train the model, based on the simulated data.

7. The electronic device of claim 1, wherein the at least one processor is further configured to:
train the model in a Markov decision process (MDP) scheme,
configure, in the model, a state related to a network environment, an action comprising an off threshold of a cell, and a reward related to power consumption and network performance, and
train the model so as to determine an action for which a highest reward is given.

8. The electronic device of claim 7, wherein the at least one processor is further configured to:
configure, in the model, an object performance which is a type of performance subject to model training, and a minimum performance criterion which is a minimum level to satisfy a result of acting of the trained model.

9. The electronic device of claim 7, wherein the state comprises at least one of day and/or time information, an on and/or off state of a cell, PRB usage before a specified time, or throughput before the specified time.

10. The electronic device of claim 7, wherein the reward comprises at least one of a reward of applying a specified value when power consumption is reduced, a reward of applying a specified value when an object performance increases, or a penalty of subtracting a specified value when an object performance is less than a minimum performance level.

11. A method of operating an electronic device, the method comprising:
obtaining data related to a network situation of a base station from a communication circuit;
calculating a performance indicator value related to network performance according to a performance indicator, based on the data related to the network situation;
training a model, based on the performance indicator value calculated according to the performance indicator;
determining an off threshold of traffic for turning off a cell, based on the trained model; and
transmitting the determined off threshold to the base station via the communication circuit.

12. The method of claim 11, further comprising:
determining an activation threshold of traffic for activating the cell, based on the trained model; and
transmitting the determined activation threshold to the base station via the communication circuit.

13. The method of claim 11, wherein the performance indicator comprises at least one of physical resource block (PRB) usage information, IP throughput, a number of UEs connected to RRC, a handover count, or downlink volume.

14. The method of claim 11, further comprising:
compressing the performance indicator value with respect to a specified period; and
training the model, based on the compressed performance indicator value.

15. The method of claim 14, further comprising compressing the performance indicator value in at least one scheme among:
a first scheme of generating compressed data by extracting a largest value from the performance indicator value,
a second scheme of generating compressed data by extracting an upper-level value of a specified ratio from the performance indicator value,
a third scheme of generating compressed data by extracting an average value from the performance indicator value,
a fourth scheme of generating compressed data by extracting a lower-level value of a specified ratio from the performance indicator value, and
a fifth scheme of generating compressed data by extracting a minimum value from the performance indicator value.

16. The method of claim 14, further comprising:
simulating, by a simulator, the compressed performance indicator value; and
training the model, based on the simulated data.

17. The method of claim 14, further comprising:
training the model in an MDP scheme;
configuring, in the model, a state related to a network environment, an action comprising an off threshold of a cell, and a reward related to power consumption and network performance; and
training the model so as to determine an action for which a highest reward is given.

18. The method of claim 17, further comprising:
configuring, in the model, an object performance which is a type of performance subject to model training, and a minimum performance criterion which is a minimum level to satisfy a result of acting of the trained model.

19. The method of claim 17, wherein the state comprises at least one of day and/or time information, an on and/or off state of a cell, PRB usage before a specified time, or throughput before the specified time.

20. The method of claim 17, wherein the reward comprises at least one of a reward of applying a specified value when power consumption is reduced, a reward of applying a specified value when an object performance increases, or a penalty of subtracting a specified value when an object performance is less than a minimum performance level.

21. The method of claim 19, further comprising:
dividing and overlapping the calculated performance indicator value in a unit of the specified period; and
aligning the performance indicator value with regard to each time.

* * * * *